（12) United States Patent
Fukumoto

(10) Patent No.: US 10,725,262 B2
(45) Date of Patent: Jul. 28, 2020

(54) LENS HOLDING MECHANISM AND OPTICAL EMITTER

(71) Applicant: MITUTOYO CORPORATION, Kanagawa (JP)

(72) Inventor: Yasushi Fukumoto, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/203,043

(22) Filed: Nov. 28, 2018

(65) Prior Publication Data

US 2019/0170964 A1 Jun. 6, 2019

(30) Foreign Application Priority Data

Dec. 1, 2017 (JP) ................................. 2017-231848

(51) Int. Cl.
| | |
|---|---|
| *G02B 7/02* | (2006.01) |
| *F21V 17/12* | (2006.01) |
| *F21V 5/04* | (2006.01) |
| *F21V 17/06* | (2006.01) |
| *F21V 7/00* | (2006.01) |
| *F21V 5/00* | (2018.01) |
| *F21Y 115/10* | (2016.01) |

(52) U.S. Cl.
CPC .................. *G02B 7/02* (2013.01); *F21V 5/00* (2013.01); *F21V 5/04* (2013.01); *F21V 7/0091* (2013.01); *F21V 17/06* (2013.01); *F21V 17/12* (2013.01); *G02B 7/022* (2013.01); *F21Y 2115/10* (2016.08)

(58) Field of Classification Search
CPC ...... G02B 7/02; G02B 7/022; G02B 19/0047; G02B 19/0061; F21V 5/00; F21V 5/006; F21V 5/043; F21V 5/048; F21V 17/04; F21V 17/06; F21V 17/12; F21V 7/0091
See application file for complete search history.

(56) References Cited

U.S. PATENT DOCUMENTS

| 8,075,165 B2 | 12/2011 | Jiang et al. | |
|---|---|---|---|
| 2005/0122713 A1* | 6/2005 | Hutchins | F21L 4/027 362/205 |
| 2006/0158895 A1* | 7/2006 | Brands | F21L 4/027 362/555 |
| 2011/0080725 A1* | 4/2011 | Brands | F21V 5/006 362/187 |
| 2012/0187836 A1* | 7/2012 | Hashimoto | F21V 5/04 315/51 |

(Continued)

*Primary Examiner* — Alan B Cariaso
(74) *Attorney, Agent, or Firm* — Greenblum & Bernstein, P.L.C.

(57) ABSTRACT

A lens holding mechanism includes a lens barrel housing a lens that includes an entrance surface and an exit surface that are separated from each other in an optical axis direction, and a tapering surface, a diameter of which increases from the entrance surface side toward the exit surface side; a first abutting member that abuts, from the exit surface side, the lens housed in the lens barrel, and has an abutting portion that abuts the lens formed along a plane perpendicular to a reference axis of the lens barrel; and a second abutting member that abuts the tapering surface of the lens housed in the lens barrel, has an abutting portion that abuts the lens formed along a circle with a center point on the reference axis of the lens barrel, and holds the lens between the second abutting member and the first abutting member.

6 Claims, 7 Drawing Sheets

(56) References Cited

U.S. PATENT DOCUMENTS

2014/0168996 A1* 6/2014 Kajiwara .................. F21V 5/04
                                                                   362/311.02
2017/0329131 A1* 11/2017 Okada ..................... G02B 7/006

* cited by examiner

LENS HOLDING MECHANISM AND OPTICAL EMITTER

CROSS-REFERENCE TO RELATED APPLICATIONS

The present application claims priority under 35 U.S.C. § 119 of Japanese Application No. 2017-231848, filed on Dec. 1, 2017, the disclosure of which is expressly incorporated by reference herein in its entirety.

BACKGROUND OF THE INVENTION

1. Field of the Invention

The present invention relates to a lens holding mechanism and an optical emitter.

2. Description of Related Art

An optical emitter is known which includes a light-emitting device and a collimator lens that is arranged on a light-emitting surface side of the light-emitting device. In recent years, there are cases of using an LED device with lens as the light-emitting device and what is known as an LED lens as the collimator lens in such optical emitters (see the specification of U.S. Pat. No. 8,075,165). The LED lens can be mass produced by injection molding, for example, and is cheaper than an ordinary condenser lens. In addition, the LED lens can be attached directly to the LED device with lens, and therefore is capable of effective collimation.

An example of the various components that are used as the LED lens is a component that includes, for example, an entrance surface and an exit surface that are separated from each other in an optical axis direction; a tapering surface, a diameter of which increases from the entrance surface side toward the exit surface side; and an outer circumferential surface provided between the tapering surface and the exit surface.

For example, when an optical emitter provided with an LED lens such as that described above is used as illumination in an optical microscope, an image measurement apparatus, or the like, for ease of measurement, it is preferred that the LED lens be favorably centered and an optical axis of the light-emitting device be aligned with the optical axis of the LED lens. In order to do this, the centering may, for example, be performed with the outer circumferential surface of the LED lens as a reference. However, gate marks and the like may be left behind on the outer circumferential surface of an LED lens produced by injection molding or the like, and using the outer circumferential surface as the reference for centering may be difficult.

SUMMARY OF THE INVENTION

In view of the above, the present invention provides a lens holding mechanism and optical emitter capable of favorably centering a lens.

In order to resolve the aforementioned challenges, a lens holding mechanism according to one embodiment of the present invention includes a lens barrel housing a lens that includes an entrance surface and an exit surface that are separated from each other in an optical axis direction, and a tapering surface, a diameter of which increases from the entrance surface side toward the exit surface side; a first abutting member that abuts, from the exit surface side, the lens housed in the lens barrel, and has an abutting portion that abuts the lens formed along a plane perpendicular to a reference axis of the lens barrel; and a second abutting member that abuts the tapering surface of the lens housed in the lens barrel, has an abutting portion that abuts the lens formed along a circle with a center point on the reference axis of the lens barrel, and holds the lens between the second abutting member and the first abutting member.

For example, the first abutting member can be configured as part of the lens barrel. In such a case, an outer circumferential surface that engages coaxially with an inner circumferential surface of the lens barrel can be provided to the second abutting member.

Also, the second abutting member can be configured as part of the lens barrel, for example. In such a case, an outer circumferential surface that engages coaxially with the inner circumferential surface of the lens barrel can be provided to the first abutting member.

An optical emitter according to the one embodiment of the present invention includes a base member; a light-emitting device that is attached to the base member; a lens that includes an entrance surface facing a light-emitting surface of the light-emitting device, an exit surface separated from the entrance surface in an optical axis direction, and a tapering surface, a diameter of which increases from the entrance surface side toward the exit surface side; and the lens holding mechanism described above that holds the lens and engages coaxially with an engagement surface of the base member.

According to the present invention, a lens holding mechanism and optical emitter can be provided that are capable of favorably centering a lens.

BRIEF DESCRIPTION OF THE DRAWINGS

The present invention is further described in the detailed description which follows, in reference to the noted plurality of drawings by way of non limiting examples of exemplary embodiments of the present invention, in which like reference numerals represent similar parts throughout the several views of the drawings, and wherein.

DETAILED DESCRIPTION OF THE INVENTION

Figure 1:
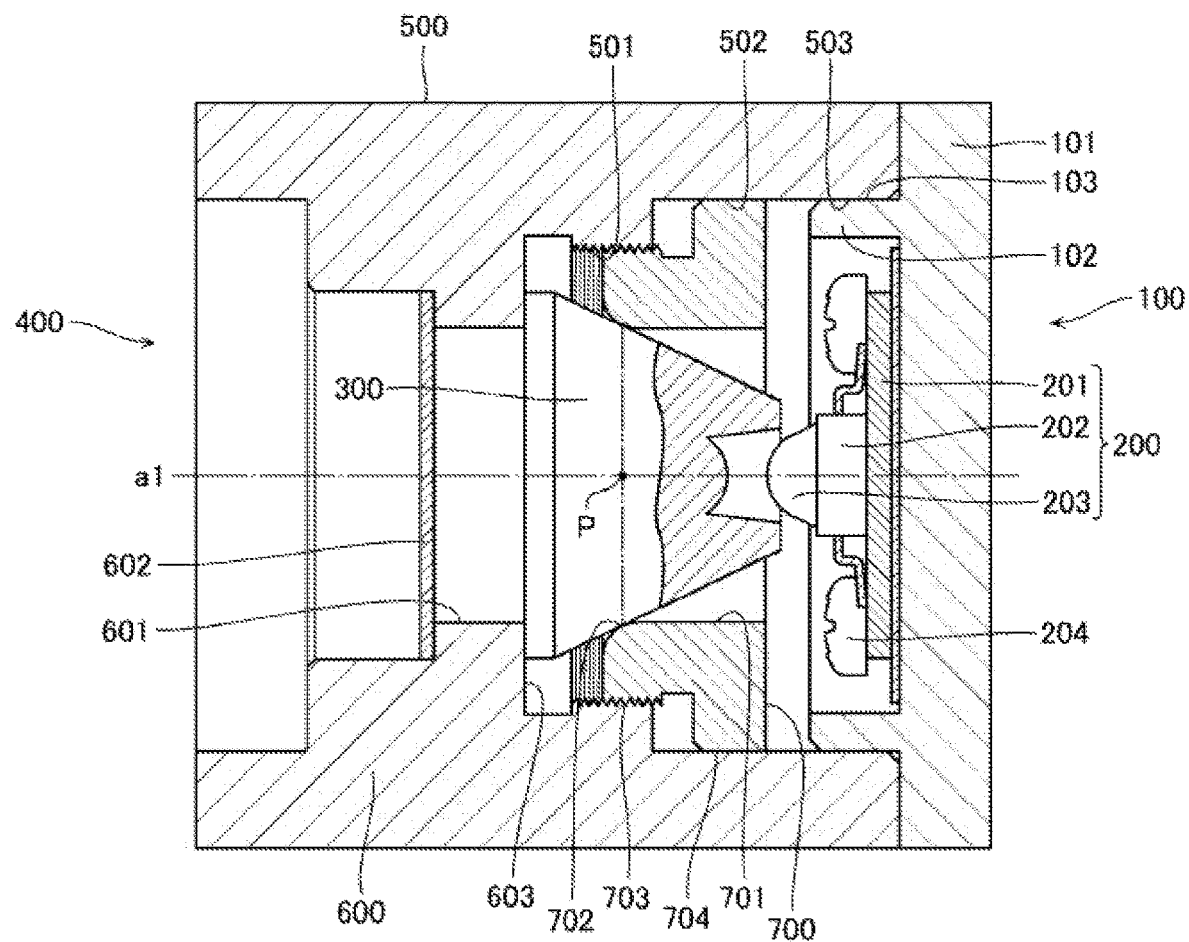
FIG. 1 is a cross-sectional view of an optical emitter according to a first embodiment of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Hereafter, an optical emitter according to a first embodiment of the present invention is described with reference to FIGS. 1 and 2. The optical emitter according to the present embodiment can be installed in an optical measurement apparatus such as an optical microscope or an image measurement apparatus, for example, and can be used for epi-illumination, transillumination, and the like. The optical emitter includes a base member (base) 100, a light-emitting device (light emitter) 200 that is attached to the base member 100, a lens 300 that is arranged on a light-emitting surface side of the light-emitting device 200, and a lens holding mechanism (lens holding frame) 400 that holds the lens 300 and can be attached to the base member 100.

The base member 100 includes a substantially disc-shaped base 101, and a substantially annular projection 102 projecting from the base 101 toward the lens 300 along a reference axis a1 direction. An outer circumferential surface of the projection 102 includes an engagement surface 103 that is formed along a cylindrical surface. The engagement surface 103 engages coaxially with a lens barrel 500 of the lens holding mechanism 400. The engagement surface 103 can also be provided on an inner circumferential surface of the projection 102, for example.

The light-emitting device 200 is what is known, for example, as an LED with lens, and includes a base plate 201, a light-emitting element 202 provided on the base plate 201, and a lens 203 provided on the light-emitting surface side of the light-emitting element 202. The lens 203 has the same optical axis as the light-emitting device 200, and an exit surface of the lens 203 is the light-emitting surface of the light-emitting device 200. The light-emitting device 200 undergoes a centering process such that the optical axis of the light-emitting device 200 matches a center axis of the engagement surface 103 of the base member 100, and in this state, the light-emitting device 200 is fixed to the base member 100 by a male screw 204.

Figure 2:
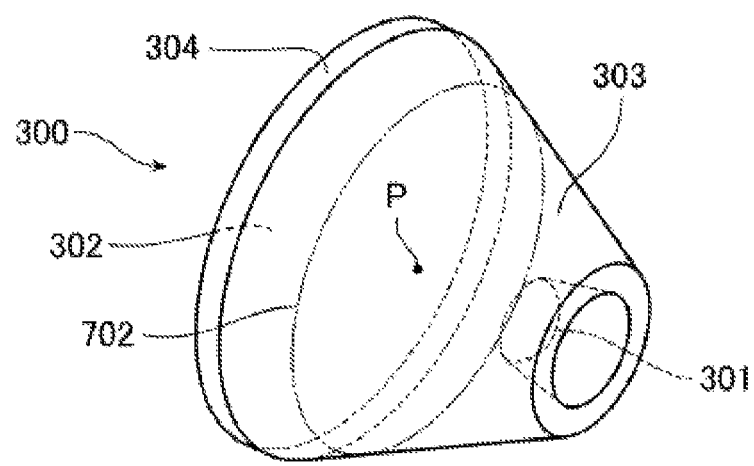
FIG. 2 is a perspective view illustrating a lens 300 according to an embodiment.

As illustrated in FIG. 2, the lens 300 is an LED lens having substantially a truncated cone shape, for example, and includes an entrance surface 301 in the shape of a convex surface facing the light-emitting surface of the light-emitting device 200; an exit surface 302 in the shape of a flat surface and separated from the entrance surface 301 in an optical axis direction; a tapering surface 303 in the shape of a conical surface, the diameter of which increases from the entrance surface 301 side toward the exit surface 302 side; and an outer circumferential surface 304 in the shape of a cylindrical surface and provided between the tapering surface 303 and the exit surface 302. Of the light emitted from the light-emitting device 200, light that is emitted in the vicinity of the optical axis is collimated by the entrance surface 301, and light that is emitted at a portion away from the optical axis is collimated by the tapering surface 303.

The lens holding mechanism 400, as illustrated in FIG. 1, includes the lens barrel 500 which houses the lens 300, a first abutting member (first abutting frame) 600 that abuts the exit surface 302 of the lens 300 from the exit surface 302 side, and a second abutting member (second abutting frame) 700 that abuts the tapering surface 303 of the lens 300 from the entrance surface 301 side. The first abutting member 600 and the second abutting member 700 hold the lens 300 therebetween in the reference axis a1 direction.

The lens barrel 500 is formed in a substantially cylindrical shape that is coaxial with the reference axis a1. The first abutting member 600, female threading 501, a first engagement surface 502, and a second engagement surface 503 are provided on the inner circumferential surface of the lens barrel 500 in that order from a first end side to a second end side. The female threading 501 is female threading that threadably engages with male threading 703 of the second abutting member 700, and has an inner diameter greater than an outer diameter of the lens 300. The first engagement surface 502 is a surface engaging coaxially with an engagement surface 704 of the second abutting member 700. The first engagement surface 502 has an inner diameter greater than the inner diameter of the female threading 501, and is formed along a cylindrical surface that is coaxial with the reference axis a1. The second engagement surface 503 is a surface engaging coaxially with an engagement surface 103 of the base member 100. The second engagement surface 503 has an inner diameter that is the same as or greater than the inner diameter of the first engagement surface 502, and is formed along a cylindrical surface that is coaxial with the reference axis a1. The second engagement surface 503 may also be provided on the outer circumferential surface of the lens barrel 500.

The first abutting member 600 is formed as part of the lens barrel 500. The first abutting member 600 is formed in a substantially annular shape that is coaxial with the reference axis a1, and has an opening 601 provided at a center portion thereof. An inner diameter of the opening 601 is smaller than the outer diameter of the lens 300. A diffusion plate 602 is fitted together with the opening 601. In addition, the first abutting member 600 includes an abutting surface 603 that abuts the exit surface 302 of the lens 300 from the exit surface 302 side. The abutting surface 603 is formed along a plane perpendicular to the reference axis a1, and is a surface that allows the lens 300 to slide along the plane. The abutting surface 603 can, for example, be formed as a plane. However, the abutting surface 603 is not required to be a plane, and can simply be formed so as to follow a plane in a sliding range of the lens 300. For example, a hole, groove, or the like may be provided to the abutting surface 603. A diameter of the abutting surface 603 is greater than the outer diameter of the lens 300.

The second abutting member 700 is formed as a separate member from the lens barrel 500. The second abutting member 700 is formed in a substantially annular shape, and has an opening 701 provided at a center portion thereof. An inner diameter of the opening 701 is smaller than the outer diameter of the lens 300. In addition, an abutting portion (abutting surface) 702 that abuts the tapering surface 303 of the lens 300 is provided between a surface of the second abutting member 700 that faces the first abutting member 600 and an inner circumferential surface of the opening 701. As illustrated in FIG. 2, the abutting portion 702 is formed/ extends along a circle. As illustrated in FIG. 1, this circle is perpendicular to the reference axis a1 and includes a center point P that lies on the reference axis a1. The abutting portion 702 can, for example, be formed as a continuous circle. However, the abutting portion 702 is not required to be a continuous circle, and may also be formed along a circle such as described above, in a range that allows the lens 300 to be centered. For example, the abutting portion 702 can also be formed as a collection of discrete points provided along a circle such as described above. In addition, roundness processing or the like can be performed on the abutting portion 702 and the abutting portion 702 can be formed as a curved surface, or chamfering processing or the like can be performed on the abutting portion 702 and the abutting portion 702 can be formed as an inclined surface (conical surface or tapering surface). Also, the male threading 703 and the engagement surface 704 are provided on the outer circumferential surface of the second abutting member 700 in that order from a first end side to a second end side. The male threading 703 is male threading that threadably engages with the female threading 501 of the lens barrel 500. The engagement surface 704 is a surface engaging coaxially with the first engagement surface 502 of the lens barrel 500, and is formed/extends along a cylindrical surface that has an outer diameter greater than the male threading 703.

Hereafter, a method of assembling an optical emitter according to the present embodiment is described. For example, first, the lens 300 is housed on an interior of the lens barrel 500 such that the exit surface 302 of the lens 300 faces the abutting surface 603 of the first abutting member 600. Next, the first engagement surface 502 of the lens barrel 500 and the engagement surface 704 of the second abutting member 700 are fitted together such that the tapering surface 303 of the lens 300 faces the abutting portion 702. Next, the female threading 501 of the lens barrel 500 is threaded together with the male threading 703 of the second abutting member 700, and the lens 300 is held between the first abutting member 600 and the second abutting member 700. During this, the second abutting member 700 presses against the tapering surface 303 of the lens 300 in a direction where the optical axis of the lens 300 matches the reference axis a1, and the lens 300 slides over the abutting surface 603 of the first abutting member 600. As a result, the threading engagement with the second abutting member 700 ends, causing the optical axis of the lens 300 to automatically match the reference axis a1. Next, the base member 100, to which the light-emitting device 200 is attached, is fitted together with the lens barrel 500. Accordingly, the optical axis of the light-emitting device 200 also matches the reference axis a1.

In the lens holding mechanism 400 having this configuration, the lens 300 is centered with the exit surface 302 and the tapering surface 303 of the lens 300 as references, rather than using the outer circumferential surface 304 of the lens 300 as the reference. In this example, the exit surface 302 and the tapering surface 303 are portions directly contributing to optical properties of the lens 300, unlike the outer circumferential surface 304, and therefore a gate mark or the like is unlikely to be left behind. Therefore, by using such portions as the references, the lens 300 can be favorably centered.

In addition, in the lens holding mechanism 400 having this configuration, each structure is fitted together coaxially by engagement surfaces formed along cylindrical surfaces. Such a configuration can be manufactured with a high degree of accuracy by lathe processing, for example. Therefore, by using such a configuration, the lens 300 can be centered with a high degree of accuracy.

Figure 3:
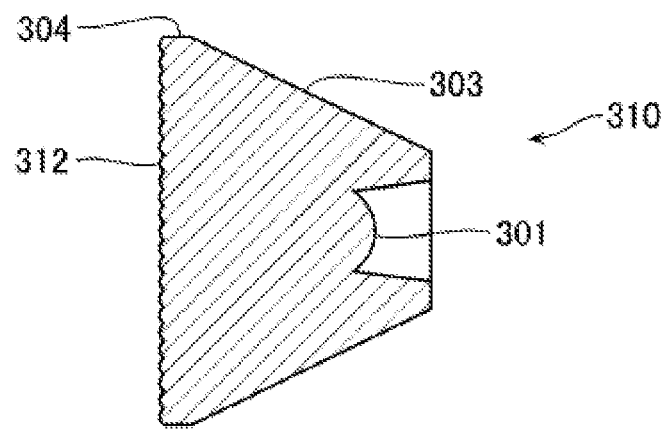
FIG. 3 is a cross-sectional view illustrating a lens 310 according to another embodiment.
Figure 4:
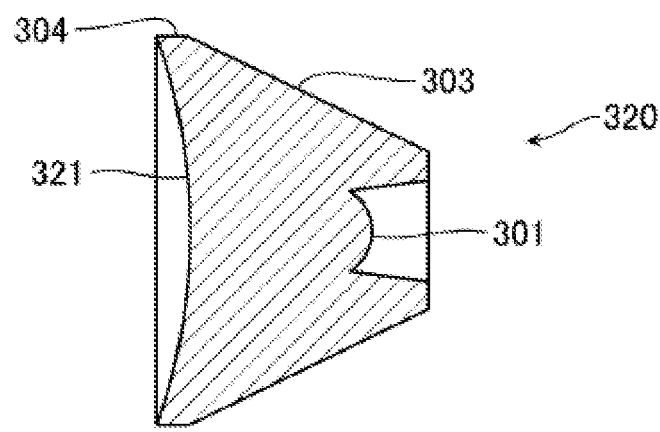
FIG. 4 is a cross-sectional view illustrating a lens 320 according to another embodiment.
Figure 5:
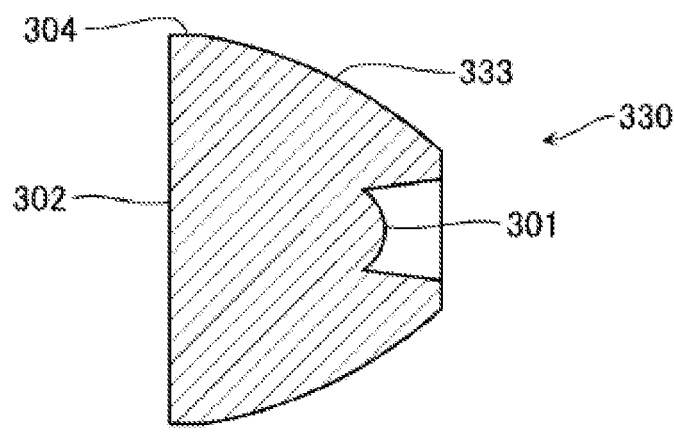
FIG. 5 is a cross-sectional view illustrating a lens 330 according to another embodiment.
Figure 6:
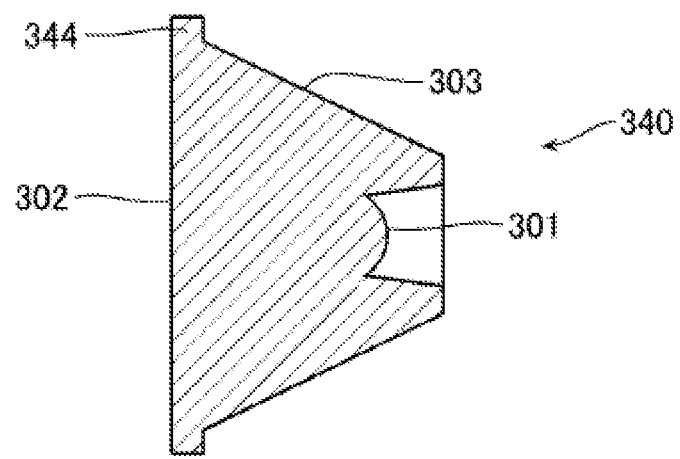
FIG. 6 is a cross-sectional view illustrating a lens 340 according to another embodiment.
Figure 7:
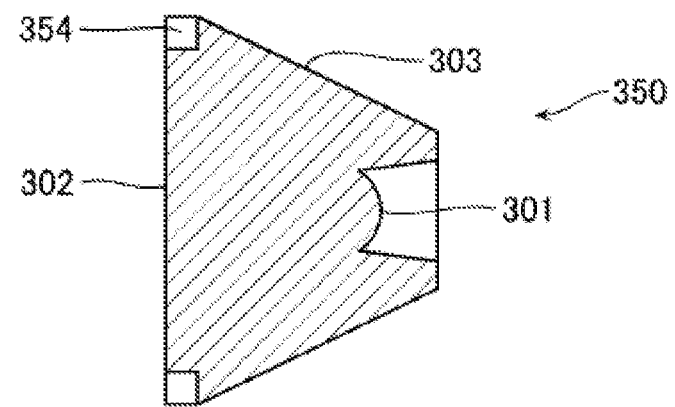
FIG. 7 is a cross-sectional view illustrating a lens 350 according to another embodiment.

The optical emitter according to the present embodiment can employ various types of lenses. For example, the exit surface 302 of the lens 300 presented as an example in FIG. 1 is a flat surface, but as illustrated in FIG. 3, a lens 310 can also be used that has unevenness for scattering or the like on an exit surface 312, or a lens 320 as illustrated in FIG. 4 can also be used in which a center portion of an exit surface 321 is recessed. In such cases, the abutting surface 603 of the first abutting member 600 abuts a projecting portion of the exit surface 312, an outer edge portion of the exit surface 321, or the like. Also, the tapering surface 303 of the lens 300 illustrated in FIG. 1 is formed in a straight line in cross-section, but a lens 330 such as that illustrated in FIG. 5 can also be used having a tapering surface 333 that is formed in a curved line in cross-section. In addition, the outer circumferential surface 304 of the lens 300 presented as an example in FIG. 1 is a peripheral surface that is coaxial with the optical axis, but a lens 340 such as that illustrated in FIG. 6 can also be used that has a protrusion on an outer circumferential surface 344, or a lens 350 as illustrated in FIG. 7 can also be used where a portion of an outer circumferential surface 354 is missing. Furthermore, a lens having a polygonal conical shape other than the truncated cone shape, such as a quadrangular pyramid shape, can also be used.

Second Embodiment

Figure 8:
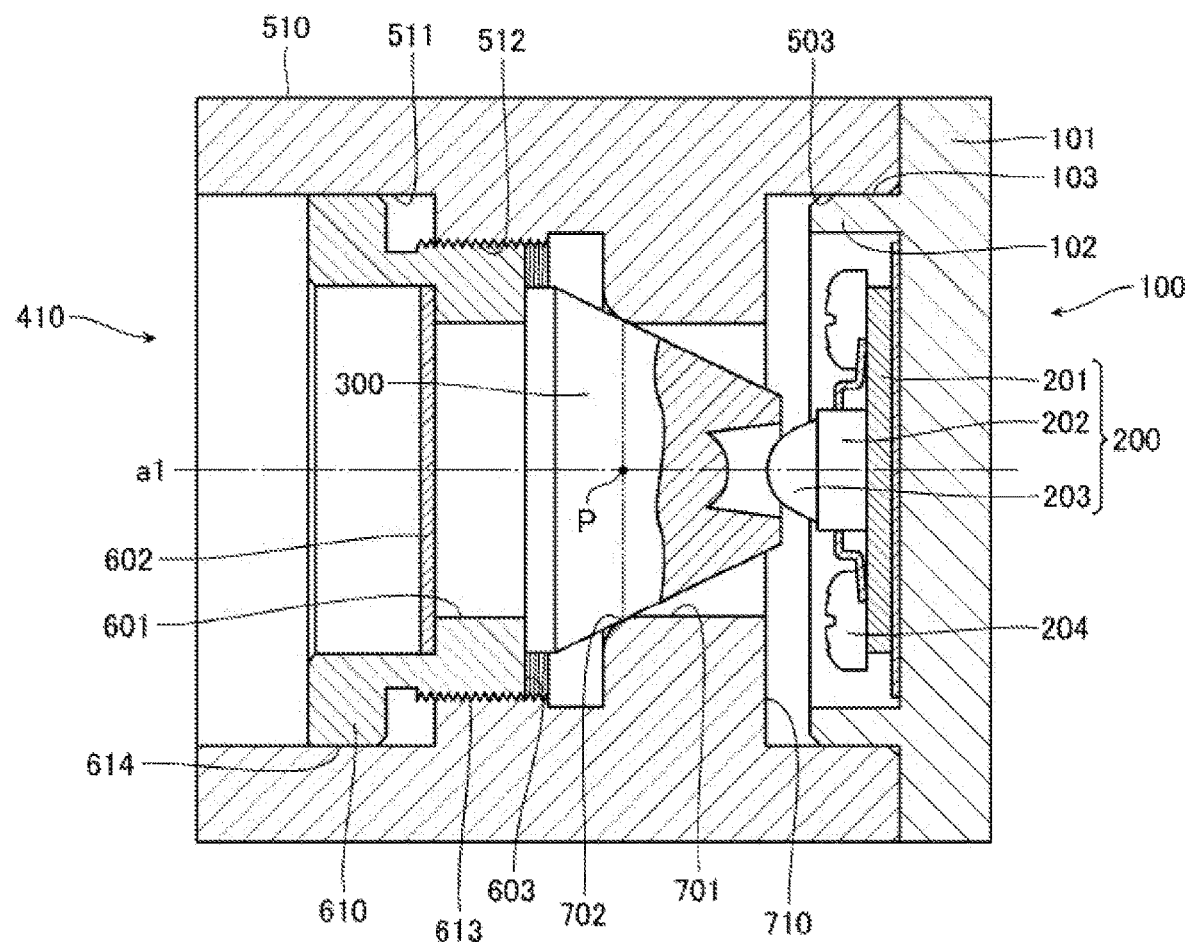
FIG. 8 is a cross-sectional view of an optical emitter according to a second embodiment of the present invention.

Next, an optical emitter according to a second embodiment of the present invention is described with reference to FIG. 8. In the following description, portions similar to those of the first embodiment are assigned the same reference numerals, and a description thereof is omitted.

The optical emitter according to the present embodiment is configured in basically the same way as the optical emitter according to the first embodiment. However, in the lens holding mechanism 400 according to the first embodiment, the first abutting member 600 is formed as part of the lens barrel 500 and the second abutting member 700 is formed as a separate member from the lens barrel 500. In contrast, in a lens holding mechanism 410 according to the present embodiment, a second abutting member 710 is formed as part of a lens barrel 510 and a first abutting member 610 is formed as a separate member from the lens barrel 510.

Similar to the lens barrel 500 according to the first embodiment, the lens barrel 510 is formed in a substantially cylindrical shape that is coaxial with the reference axis a1. Also, a third engagement surface 511, female threading 512, the second abutting member 710, and the second engagement surface 503 are provided on the inner circumferential surface of the lens barrel 510 in that order from a first end side to a second end side. The third engagement surface 511 is a surface engaging coaxially with an engagement surface 614 of the first abutting member 610. The third engagement surface 511 has an inner diameter greater than the inner diameter of the female threading 512, and is formed along a cylindrical surface that is coaxial with the reference axis a1. The female threading 512 is female threading that threadably engages with male threading 613 of the first abutting member 610, and has an inner diameter greater than the outer diameter of the lens 300.

Similar to the first abutting member 600 according to the first embodiment, the first abutting member 610 is formed in substantially an annular shape, is provided with the opening 601 at a center portion thereof, and includes the abutting surface 603 that abuts the exit surface 302 of the lens 300 from the exit surface 302 side. Also, the engagement surface 614 and the male threading 613 are provided on the outer circumferential surface of the first abutting member 610 in that order from a first end side to a second end side. The engagement surface 614 is a surface engaging coaxially with the third engagement surface 511 of the lens barrel 510, and is formed along a cylindrical surface that has an outer diameter greater than the male threading 613. The male threading 613 is male threading that threadably engages with the female threading 512 of the lens barrel 510.

The second abutting member 710 is formed in a substantially annular shape that is coaxial with the reference axis a1. In addition, similar to the second abutting member 700 according to the first embodiment, the second abutting member 710 is provided with the opening 701 at a center portion thereof, and the abutting portion 702 is provided between a surface of the second abutting member 710 that faces the first abutting member 610 and an inner circumferential surface of the opening 701.

Effects similar to those of the lens holding mechanism 400 according to the first embodiment can also be achieved with the lens holding mechanism 410 configured in this way.

Third Embodiment

Figure 9:
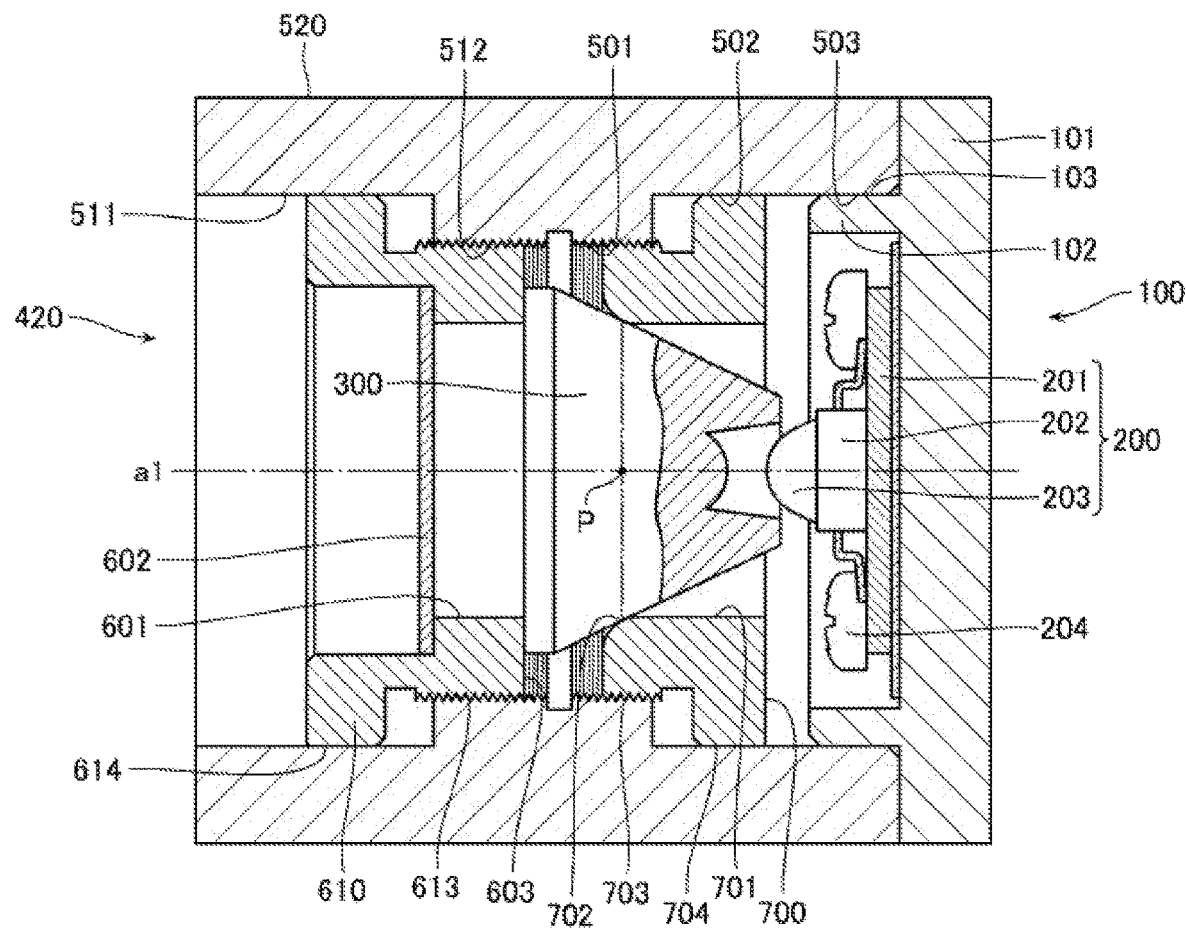
FIG. 9 is a cross-sectional view of an optical emitter according to a third embodiment of the present invention.

Next, an optical emitter according to a third embodiment of the present invention is described with reference to FIG. 9. In the following description, portions similar to those of the first and second embodiments are assigned the same reference numerals, and a description thereof is omitted.

The optical emitter according to the present embodiment is configured in basically the same way as the optical emitters according to the first and second embodiments. However, in the lens holding mechanisms 400 and 410 according to the first and second embodiments, respectively, one of the first abutting member and the second abutting member (600 and 710, respectively) is formed as part of the lens barrel (500 or 510) and the other (610 or 700) is formed as a separate member from the lens barrel (500 or 510). In contrast, in a lens holding mechanism 420 according to the present embodiment, both the first abutting member 610 and the second abutting member 700 are formed as separate members from a lens barrel 520.

Similar to the lens barrels 500 and 510 according to the first and second embodiments, respectively, the lens barrel 520 is formed in a substantially cylindrical shape that is coaxial with the reference axis a1. Also, the third engagement surface 511, the female threading 512, the female threading 501, the first engagement surface 502, and the second engagement surface 503 are provided on the inner circumferential surface of the lens barrel 520 in that order from a first end side to a second end side.

Effects similar to those of the lens holding mechanisms 400 and 410 according to the first and second embodiments, respectively, can also be achieved with the lens holding mechanism 420 configured in this way. In addition, with the lens holding mechanism 420 configured in this way, the first abutting member 610 and the second abutting member 700 are both configured as separate members from the lens barrel 520, and therefore a distance between the light-emitting device 200 and the lens 300 can also be adjusted by adjusting the reference axis a1 direction positions of the first abutting member 610 and second abutting member 700.

Forth Embodiment

Figure 10:
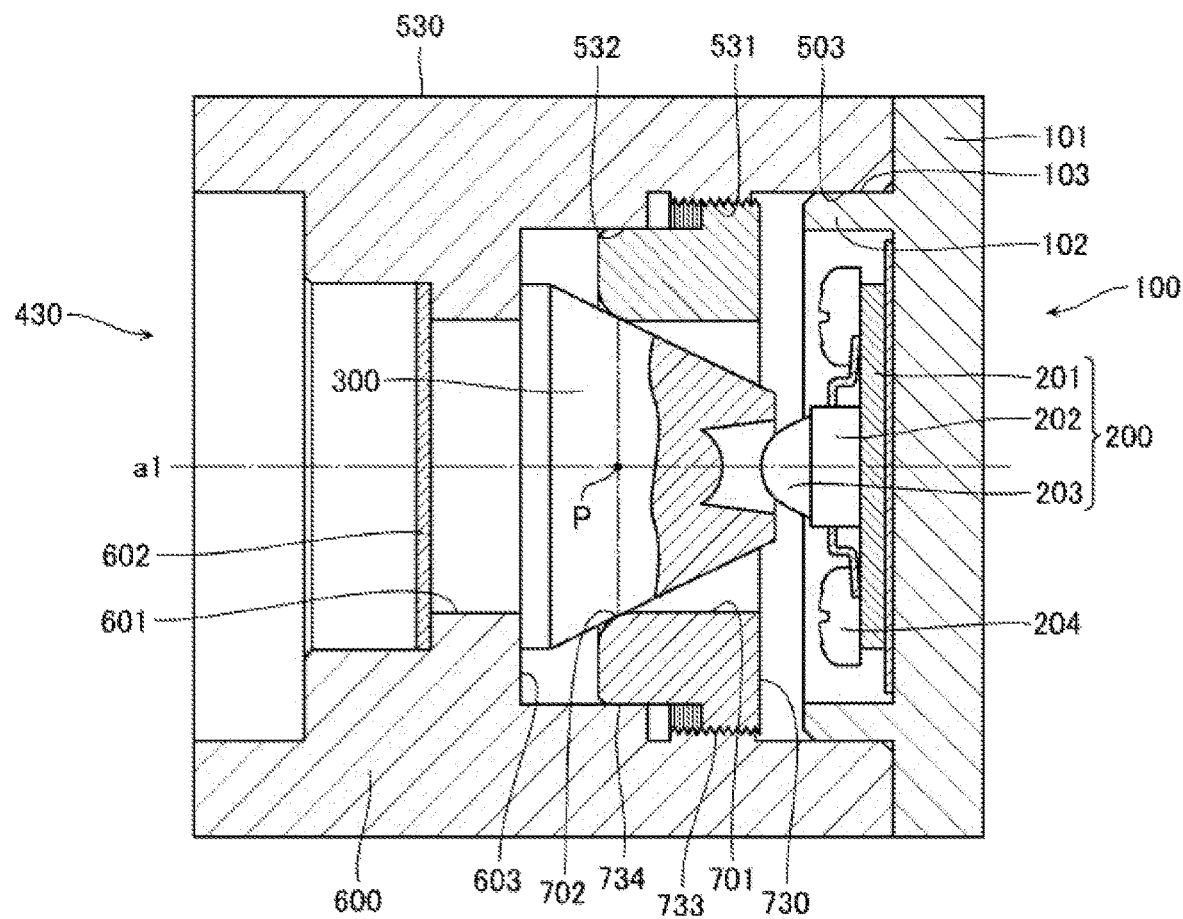
FIG. 10 is a cross-sectional view of an optical emitter according to a fourth embodiment of the present invention.

Next, an optical emitter according to a fourth embodiment of the present invention is described with reference to FIG. 10. In the following description, portions similar to those of the first embodiment are assigned the same reference numerals, and a description thereof is omitted.

The optical emitter according to the present embodiment is configured in basically the same way as the optical emitter according to the first embodiment. However, in the lens holding mechanism 400 according to the first embodiment, the outer diameter of the engagement surface 704 provided on the outer circumferential surface of the second abutting member 700 is greater than the outer diameter of the male threading 703. In contrast, in the lens holding mechanism 430 according to the present embodiment, an outer diameter of an engagement surface 734 provided on an outer circumferential surface of a second abutting member 730 is smaller than an outer diameter of male threading 733.

Similar to the lens barrel 500 according to the first embodiment, a lens barrel 530 is formed in a substantially cylindrical shape that is coaxial with the reference axis a1. Also, the first abutting member 600, a first engagement surface 532, female threading 531, and the second engagement surface 503 are provided on the inner circumferential surface of the lens barrel 530 in that order from a first end side to a second end side. The first engagement surface 532 is a surface engaging coaxially with an engagement surface 734 of the second abutting member 730. The first engagement surface 532 has an inner diameter greater than the outer diameter of the lens 300, and is formed along a cylindrical surface that is coaxial with the reference axis a1. The female threading 531 is female threading that threadably engages with the male threading 733 of the second abutting member 730, and has an inner diameter greater than that of the first engagement surface 532.

Similar to the second abutting member 700 according to the first embodiment, the second abutting member 730 is formed in substantially an annular shape, is provided with the opening 701 at a center portion thereof, and has the abutting portion 702 provided between a surface of the second abutting member 730 that faces the first abutting member 610 and an inner circumferential surface of the opening 701. Also, an engagement surface 734 and the male threading 733 are provided on the outer circumferential surface of the second abutting member 730 in that order from a first end side to a second end side. The engagement surface 734 is a surface engaging coaxially with the first engagement surface 532 of the lens barrel 530. The male threading 733 is male threading that threadably engages with the female threading 531 of the lens barrel 530.

Effects similar to those of the lens holding mechanism 400 according to the first embodiment can also be achieved with the lens holding mechanism 430 configured in this way.

Similar to the first embodiment, in the lens holding mechanism 430 according to the present embodiment, the first abutting member 600 is formed as part of the lens barrel 530 and the second abutting member 730 is formed as a separate member from the lens barrel 530. However, similar to the second and third embodiments, the first abutting member can also be formed as a separate member from the lens barrel, for example. In such a case, the outer diameter of the engagement surface provided on the outer circumferential surface of the second abutting member can be configured to be smaller than the outer diameter of the male threading.

Other Embodiments

In the foregoing description, lens holding mechanisms according to first through fourth embodiments of the present invention are described. However, the first through fourth embodiments are merely provided by way of example, and the form each configuration takes can be modified as appropriate. For example, in the first through fourth embodiments, examples were described that used a so-called LED lens as a collimator lens. However, a lens having substantially a disc-like shape where at least one surface is either flat or concave can also be used, for example. In such a case, the first abutting member abuts a first surface that is formed in either a flat or concave shape, and the second abutting member abuts a second surface, and by holding the lens between the first and second abutting members, the lens can be centered. Moreover, in a case where an abutting portion of the second abutting member is a curved or inclined surface, an outer edge portion of the second surface noted above can also be used to center the lens.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A lens holding mechanism comprising:
   a lens barrel that houses a lens, the lens including:
      an entrance surface and an exit surface that are separated from each other in an optical axis direction, and
      a tapering surface, a diameter of which increases from the entrance surface side toward the exit surface side;
   a first abutting frame having a first abutting surface that abuts the lens from an exit surface side and a first engagement surface, the first abutting surface extending along a plane perpendicular to a reference axis of the lens barrel, the first engagement surface is flat and extending along a plane parallel to the reference axis of the lens barrel; and
   a second abutting frame having a second abutting surface that abuts the tapering surface of the lens and an engagement surface on an extension beyond a threaded engagement between the first abutting frame and the second abutting frame, the second abutting surface extending along a circle with a center point on the reference axis of the lens barrel, the engagement surface is flat and abutting the first engagement surface aligning the first abutting frame and the second abutting frame, and the second abutting surface holding the lens between the second abutting frame and the first abutting frame.

2. The lens holding mechanism according to claim 1, wherein:
   the first abutting frame is part of the lens barrel, and
   the second abutting frame includes the engagement surface, the engagement surface including an outer circumferential surface that engages coaxially with the first engagement surface, and the first engagement surface including an inner circumferential surface of the lens barrel.

3. The lens holding mechanism according to claim 1, wherein:
   the second abutting frame is part of the lens barrel, and
   the first abutting frame includes an outer circumferential surface that engages coaxially with a third engagement surface, and the third engagement surface including an inner circumferential surface of the lens barrel.

4. An optical emitter comprising:
   a base;
   a light emitter attached to the base;
   a lens that includes an entrance surface facing a light emitting surface of the light emitter device, an exit surface separated from the entrance surface in an optical axis direction, and a tapering surface, a diameter of the tapering surface increasing from the entrance surface side toward the exit surface side; and
   a lens holder comprising:
      a lens barrel that houses the lens;
      a first abutting frame having a first abutting surface that abuts the lens from the exit surface side and a first engagement surface, the first abutting surface extending along a plane perpendicular to a reference axis of the lens barrel, the first engagement surface is flat and extending along a plane parallel to the reference axis of the lens barrel; and
      a second abutting frame having a second abutting surface that abuts the tapering surface of the lens and an engagement surface on an extension beyond a threaded engagement between the first abutting frame and the second abutting frame, the second abutting surface extending along a circle with a center point on the reference axis of the lens barrel, the engagement surface is flat and abutting the first engagement surface aligning the first abutting frame and the second abutting frame, and the second abutting surface holding the lens between the second abutting frame and the first abutting frame, wherein:
   the lens holder holds the lens and a second engagement surface engages coaxially with the base.

5. The optical emitter according to claim 4, wherein:
   the first abutting frame is part of the lens barrel, and
   the second abutting frame includes the engagement surface, the engagement surface including an outer circumferential surface that engages coaxially with the first engagement surface, and the first engagement surface including an inner circumferential surface of the lens barrel.

6. The optical emitter according to claim 4, wherein:
   the second abutting frame is part of the lens barrel, and
   the first abutting frame includes an outer circumferential surface that engages coaxially with a third engagement surface, and the third engagement surface including an inner circumferential surface of the lens barrel.

* * * * *